April 26, 1932.   C. S. BUSHNELL   1,855,596
BRAKE APPLYING APPARATUS

Filed May 17, 1929

INVENTOR
BY C. S. Bushnell,
Neil W. Preston,
his ATTORNEY

Patented Apr. 26, 1932

1,855,596

UNITED STATES PATENT OFFICE

CHARLES S. BUSHNELL, OF ROCHESTER, NEW YORK, ASSIGNOR TO GENERAL RAILWAY SIGNAL COMPANY, OF ROCHESTER, NEW YORK

BRAKE APPLYING APPARATUS

Application filed May 17, 1929. Serial No. 363,738.

This invention relates to brake control apparatus for use in connection with an automatic train control system.

The present invention is an improvement on the automatic brake control apparatus disclosed in my prior application Ser. No. 302,237 filed August 27, 1928. In said prior application I have shown how the usual engineer's brake valve of an air brake system of the normally charged brake pipe type may be modified to enable the same equalizing reservoir and equalizing discharge piston valve to be used for both manual and automatic braking, by inserting the insert 4 shown in said application (corresponding to the insert I of this application) between the top and bottom sections of the engineer's brake valve, this in order to enable the chamber D to be isolated from the rotary valve seat when an automatic brake application is to take place.

In accordance with the present invention it is proposed to carry out the functions of the system disclosed in said prior application by apparatus forming a part of such insert inserted between the top and bottom part of the engineer's brake valve, so as to constitute a unitary brake applying apparatus, and to carry out these functions in a better way as well as carrying out additional functions.

Another object of the present invention resides in the provision of poppet valves instead of slide valves for controlling the flow of fluid passage through the larger ports of the apparatus but to retain slide valves for the smaller ports and to obtain a limited reduction in brake pipe pressure by suitable means when the brakes are automatically applied. This limited reduction means is so constructed as not to be effective when a manual brake application is made, in spite of the fact that the same equalizing reservoir is vented in both instances.

Other objects, purposes, and characteristic features of the invention will in part be obvious from the accompanying drawings and in part be pointed out in detail in the description hereinafter.

In describing the invention in detail reference will be made to the accompanying drawings in which:—

Figure 1:
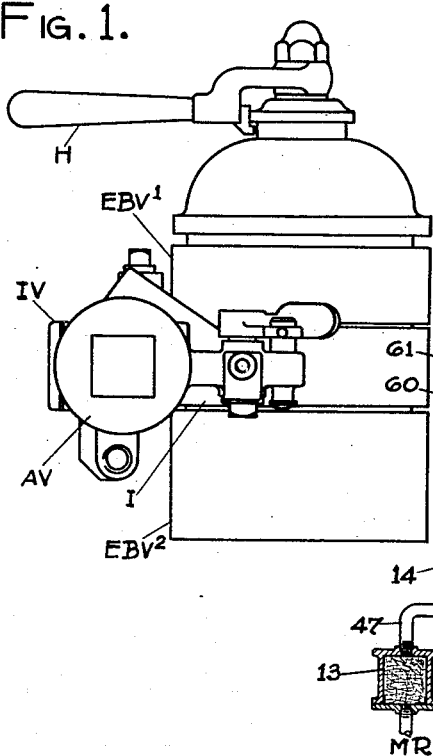
Figure 2:
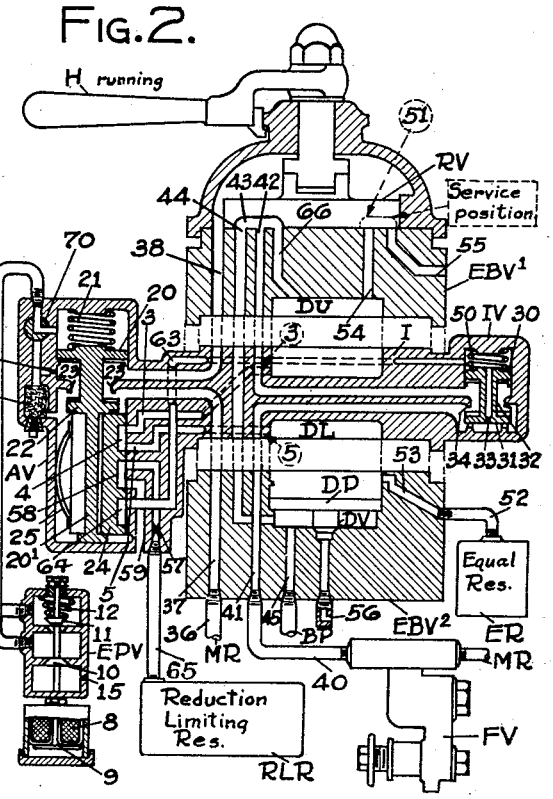
Figure 3:
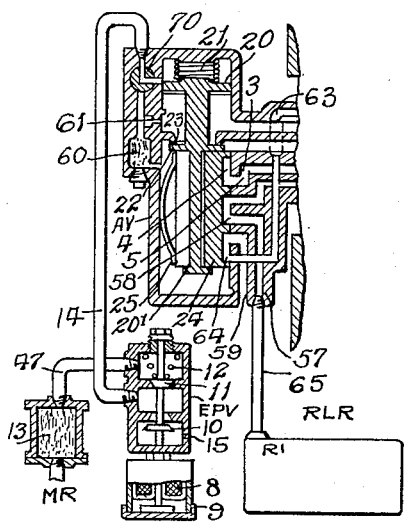

Fig. 1 shows a front elevation of an engineer's brake valve modified in accordance with the present invention, with the apparatus constructed as it appears in actual practice;

Fig. 2 shows the same engineer's brake valve in vertical section, with the insert and the associated apparatus and ports thereof shown conventionally, to facilitate illustration of these ports and passages as well as the valves controlling the same; said engineer's brake valve being shown connected to an equalizing reservoir, a main reservoir, a reduction limiting reservoir, a feed valve and the brake pipe; and Fig. 3 shows the application valve AV and the electro-pneumatic valve EPV assuming their abnormal brake applying position.

Referring to Fig. 1, the usual engineer's brake valve such as the Westinghouse type H6 or G6 brake valve, has been shown by the top part $EBV^1$ and the bottom port $EBV^2$ separated by an insert I having integral therewith an application valve AV and an isolating valve IV.

In Fig. 2 of the drawings the application valve AV, which is normally disposed horizontally, has been shown vertically in order to more clearly illustrate the ports and passages controlled by this application valve, and the isolating valve IV has also been shown vertically and has been shown on the opposite side of the engineer's brake valve with respect to the application valve, this also to facilitate illustrating the ports and passages, and description of its operating characteristics.

It will be noted that the insert I divides the usual chamber "D" into two parts, namely, upper chamber DU and the lower chamber DL, these two chambers being normally connected together through the passage 3, cavity 4, and passage 5 of the application valve AV. This engineer's brake valve includes the usual equalizing discharge piston DP and usual equalizing discharge valve DV, the usual equalizing reservoir ER and the usual feed valve FV.

The application valve AV is controlled by suitable electrical train control apparatus through the medium of the electro-pneumatic valve EPV the control circuit of which has not been shown. This valve EPV is normally held in its raised position through the medium of the coil 8, which is normally energized, acting through the armature 9 to maintain the valve 10 closed and the valve 11 open, this action of the electro-magnet 8—9 being against the force of the compression spring 12. From this it appears that the de-energization of the electro-magnet 8—9 causes the valve 10 to be opened and the valve 11 to be closed through the action of the coil spring 12. This valve EPV has three chambers of which the upper chamber is connected to main reservoir pressure through the air filterer 13, the middle chamber is connected to the application valve AV through the medium of pipe 14 and the lower chamber is connected to atmosphere through the port 15.

The application valve AV comprises an enclosed chamber of which one end consists of a cylinder containing a piston 20 urged downwardly by the compression spring 21, so as to lower the poppet valve 22 off of its seat 23, the valve stem $20^1$ being operatively connected to the slide valve 24. This slide valve 24 is urged against its seat by the spring 25.

The isolating valve IV includes a piston 30 connected to a poppet valve 31 by a hollow stem 32, this connecting stem having a restricted opening 33 passing lengthwise there through, the valve 31 being adapted to seat against the valve seat 34 under certain pressure conditions as more particularly pointed out hereinafter. It is believed that the operating characteristics of the combined manual and automatic brake control apparatus embodying the present invention is best understood by considering the operation thereof, when both manually operated and when automatically operated.

*Manual operation.*—Under normal conditions of the apparatus, that is with the engineer's brake valve handle H in the running position, as shown, main reservoir pressure may flow from the main reservoir MR (not shown) through pipe 36, passage 37, through valve 22—23, and through passage 38 to the top of the engineer's rotary valve RV. This pressure not only holds the rotary valve RV on its seat, but supplies the necessary pressure fluid for re-charging the brake pipe BP when the engineer's brake valve assumes its full-release position. It should be noted that main reservoir pressure is always present in the chamber of the application valve AV, so that the valve 24 is held on its seat by this pressure in addition to the action of spring 25. With the engineer's brake valve in its running position (as shown) the brake pipe BP is continually replenished by feed valve pressure derived from the feed valve FV through pipe 40, passage 41, poppet valve 31—34 of the isolating valve IV, passage 42, cavity 43 in the rotary valve RV, passage 44, chamber below the differential piston valve DP, and a passage 45 to the brake pipe BP.

With the electro-pneumatic valve EPV energized, main reservoir pressure may flow from the main reservoir MR, through air filterer 13, pipe 47, valve 11, pipe 14, to the chamber above piston 20 containing the compression spring 21, so that this main reservoir pressure together with the force of spring 21 holds the piston 20 in its lower position. Also, under this normal condition of the apparatus main reservoir pressure may flow through pipe 36, passage 37, into the chamber of the application valve AV, so that the piston 20 is in reality held in its lower position only by the spring 21, there being main reservoir pressure on both sides of this piston 20.

Similarly, the piston 30 is held in its lower position by the compression spring 50, because feed valve or brake pipe pressure is present below this piston 30, and is also present above this piston 30 because these pressures have equalized through the restricted port 33. It is thus seen that with the engineer's brake valve handle H in the running position and the electro-pneumatic valve EPV energized the pistons 20 and 30 are held in their lower position (as shown in Fig. 2) through the medium of their associated compression springs 21 and 50, and that the brake pipe BP is maintained charged by feed valve pressure through the medium of the feed valve FV.

Let us first assume that the engineer moves his brake valve handle H to the lap position. In this position of the apparatus all ports and passages controlled by the rotary valve RV are blanked, so that the valve mechanism and brake pipe pressure remain in their normal condition unless changed by reasons of an automatic brake application, leaks, or the like.

Let us now assume that the engineer moves his handle H to the service position. Under this condition the rotary valve, as well understood by those versed in the art of air braking, connects the upper part of "chamber D", namely the chamber DU through the medium of cavity 51 to atmosphere, this cavity 51 having been shown in dotted line because it only permits the escape of air with the rotary valve in the abnormal service position. In this position of the valve, the service position of the engineer's brake valve, the equalizing reservoir is vented to atmosphere through the pipe 52, passage 53, chamber DL, passage 5, cavity 4 of the application valve AV, passage 3, chamber DU, passage 54, cavity 51, and passage 55 to atmosphere. With the pressure above the equalizing discharge piston DP reduced this piston DP is raised, and the equalizing discharge piston valve DV is opened, and the brake pipe is discharged to atmosphere through the discharge port 56. This discharge of air from the brake pipe continues so long as the pressure below piston DP is higher than that in the equalizing reservoir and in the chamber DL.

The valve DV is closed and no more venting of the brake pipe takes place as soon as the pressures on opposite sides of the piston DP equalize. Return of the engineer's brake valve to the running position of course recharges the brake pipe BP through the medium of the feed valve FV, through the ports and passages, heretofore traced. It should be noted that the reduction limiting reservoir RLR is normally connected to atmosphere through the passage 56, restriction 57, cavity 58, and exhaust port 59. The restriction 57 is employed to restrict the rate of venting of the equalizing reservoir. This restriction 57 permits the same rate of flow of fluid pressure from the equalizing reservoir as does the engineer's brake valve when moved to the service position.

*Automatic operation.*—Let us assume that the electro-pneumatic valve EPV is de-energized in response to control imposed by suitable train control apparatus, in communication with traffic conditions in advance of the train, and that the valves 10 and 11 are moved to their lower biased position. Under this condition of the valve EPV the chamber of the application valve AV containing spring 21 is vented, and the application piston 20 is moved to its raised position by main reservoir pressure acting on the under side of this piston 20, thereby seating the valve 22 against the seat 23 and moving the slide valve 24 to its raised position.

With the poppet valve 22 in its seated position main reservoir pressure can no longer flow to the top of the rotary valve RV, through the passages heretofore traced. Main reservoir pressure may, however, flow at a restricted rate to the chamber above rotary valve RV, from the main reservoir MR, pipe 36, passage 37, chamber of the application valve AV, air filter 60, restricted port 61, passage 38, to the rotary valve chamber. This restricted flow is sufficient to provide proper supply of air through the maintaining port of the engineer's brake valve if said valve is moved to the emergency position, and also, is sufficient to maintain the rotary valve RV on its seat, but is insufficient to allow the engineer to release the air brakes by moving his rotary valve to the release position.

With the piston 20 in its raised position the slide valve 24 assumes its brake applying position, in which position of valve 24 the equalizing reservoir ER is vented into the reduction reservoir RLR through the following series of passages:—beginning at the equalizing reservoir ER, pipe 52, passage 53, chamber DL, passage 5, cavity 58, restrictive port 57, pipe 65, to the reduction limiting reservoir RLR. From this it is seen that the fluid pressure in the equalizing reservoir ER will vent into the reduction limiting reservoir RLR until these pressures have equalized. It is of course understood that this flow of equalizing reservoir pressure fluid into the closed reduction reservoir RLR will effect a pressure reduction above the equalizing discharge piston DP, so that this piston will be raised and will cause the brake pipe to be vented until it has been vented to a value equal to this equalized pressure. With the slide valve 24 assuming its raised position the chamber above the piston 30 containing the spring 50 is vented to atmosphere through passage 63, cavity 64 and exhaust passage 59. Venting of pressure from the upper side of piston 30, causes this piston to be moved to the raised position because the restricted opening 33 is very small and cannot replenish the fluid escaping, and as soon as the piston 30 has assumed its raised position and the valve 31 has seated on its seat 34 the flow of fluid pressure from the feed valve to the engineer's brake valve is cut off.

With the poppet valve 31—34 seated by this upward movement of the piston 30 the passage through which the brake pipe may be charged from the feed valve FV by moving the engineer's brake valve to the running position is cut off, so that the engineer cannot re-charge the brake pipe by moving his engineer's brake valve to the running position and therefore cannot prevent the automatic brake application by such movement. Also, with the slide valve 24 assuming its raised or brake applying position, the upper part of "chamber D", namely chamber DU, is isolated from the lower chamber DL for reasons heretofore mentioned, so that the engineer is unable to recharge the equalizing reservoir through the medium of passage 66, through which passage 66 the upper chamber DU may normally be charged by feed valve pressure when the engineer's brake valve assumes the running position.

It should be particularly noted, that the apparatus shown and described is very compact in construction, is self-contained in that it comprises an insert that may be inserted between the upper and lower part of the usual engineer's brake valve, and that the two large capacity passages are controlled by poppet valves 22—23 and 31—34, whereas the smaller passages are controlled by the slide valve 24. Further, it should be noted that upon automatic operation of the application valve AV and the isolating valve IV, main reservoir pressure flow to the top of the rotary valve RV is restricted by being required to flow through the restricted port 61, that feed valve pressure is entirely cut off by reason of the seating of the valve 31 upon its seat 34, and that the usual "chamber D" is cut off of the rotary valve seat by a partition rendered effective by the shifting of the cavity 4 in the slide valve 24. So that, even though the engineer is able to recharge the upper chamber DU by placing the engineer's brake valve in the running or release position, he is unable to charge the lower chamber DL, and therefore is unable to release the brakes or in any way diminish the extent of brake application imposed by the automatic apparatus.

The apparatus of the present invention enables the same equalizing discharge piston and valve DP—DV to be uesd for making a manual and an automatic brake application in spite of the fact that any degree of reduction may be obtained manually by venting the equalizing reservoir ER to atmosphere, whereas a limited reduction is obtained upon automatic venting of the equalizing reservoir, in which case of automatic venting it is vented into the reduction limiting reservoir RLR. Also it should be noted that only the insert I and its associated parts need be added to the already installed engineer's brake valve in case of the superimposition of automatic train control apparatus on an existing air brake system.

Having thus shown and described one rather specific embodiment of the present invention, it is desired to be understood that this has been done in order to facilitate illustration and description of the nature and functions of the invention, rather than showing the scope of the invention or the exact construction preferably employed in the practicing of the same, and that various changes, modifications, and additions may be made in applying the invention in practice without departing from the spirit or scope thereof, or the idea of means underlying the same, except as demanded by the scope of the following claims.

What I claim as new is:—

1. Automatic brake control apparatus for air brake systems of the usual normally charged brake pipe type in which venting of the brake pipe effects a brake application comprising, an engineer's brake valve consisting of an upper and lower part and having a manually operable rotary valve in the upper part thereof and an equalizing discharge piston and valve in the lower part thereof said upper and said lower part being separated, the plane of separation before these parts have been so separated passing through a chamber above said equalizing discharge piston, and a unitary structure consisting of an insert inserted between said upper and lower part and including an automatically operated valve for at times isolating said piston from the upper part of said chamber.

2. Automatic brake control apparatus for air brake systems of the usual normally charged brake pipe type in which venting of the brake pipe effects a brake application comprising, an engineer's brake valve consisting of an upper part and a lower part and having a manually operable rotary valve in the upper part thereof and an equalizing discharge piston and valve in a chamber in the lower part thereof, said upper and said lower part having complementary faces passing through a chamber above said equalizing discharge piston, and a unitary structure consisting of an insert having like complementary faces and inserted between said two parts and including an automatically operated valve integral therewith for causing said insert to divide said chamber into two parts one above the other.

3. Automatic brake control apparatus for air brake systems of the usual normally charged brake pipe type in which venting of the brake pipe effects a brake application comprising, an engineer's brake valve divided into an upper and a lower part, a manually operable rotary valve in the upper part thereof and an equalizing discharge piston and valve in the lower part thereof said upper and lower part having complementary faces passing through a chamber above said equalizing discharge piston, and a unitary structure inserted between said parts consisting of an insert having like complementary faces and having an automatically operated valve for dividing said chamber into two chambers one above the other and simultaneously therewith venting the lower one of said two chambers.

4. Automatic brake control apparatus for air brake systems of the usual normally charged brake pipe type in which venting of the brake pipe effects a brake application comprising, an engineer's brake valve consisting of an upper part and a lower part and having a manually operable rotary valve in the upper part thereof and an equalizing discharge piston and valve in the lower part thereof, said upper and said lower part having complementary faces passing horizontally through a chamber above said equalizing discharge piston, and a unitary structure consisting of an insert having like complentary faces and inserted between said upper and said lower part and including an automatically operated valve for dividing said chamber into two chambers one above the other and simultaneously therewith venting the lower one of said two chambers into another closed chamber normally charged to atmospheric pressure.

5. Automatic brake control apparatus for air brake systems of the usual normally charged brake pipe type in which venting of the brake pipe effects a brake application comprising, an engineer's brake valve consisting of an upper part and a lower part and having a manually operable rotary valve in the upper part thereof and an equalizing discharge piston and valve in the lower part thereof, said upper and said lower part having complementary faces passing through a chamber above said equalizing discharge piston, and a unitary structure consisting of an insert having like complementary faces and inserted between the upper part and the lower part of the said engineer's brake valve and having integral therewith an application valve including a poppet valve and a slide valve operatively connected together and a piston for operating said valves, said application valve and poppet valve controlling the isolating effect of said insert and the venting of the lower portion of the separated chamber.

6. Automatic brake control apparatus for air brake systems of the usual normally charged brake pipe type in which venting of the brake pipe effects a brake application comprising; an engineer's brake valve consisting of an upper part and a lower part and having a manually operable rotary valve in the upper part thereof and an equalizing discharge piston and valve in the lower part thereof; a source of feed valve pressure; and a unitary structure consisting of an insert inserted between the upper part and the lower part of said engineer's brake valve and having integral therewith valve mechanism including; a poppet valve, and a pneumatically controlled valve for cutting off the flow of main reservoir pressure from the lower part of said engineer's brake valve to the top of said rotary valve and for controlling said poppet valve, said poppet valve also being integral with said insert and controlling the flow of feed valve pressure to a port in the seat of said rotary valve.

7. Automatic brake control apparatus for air brake systems of the usual normally charged brake pipe type in which venting of the brake pipe effects a brake application comprising; an engineer's brake valve consisting of an upper part and a lower part and having a manually operable rotary valve in the upper part thereof and an equalizing discharge piston and valve in the lower part thereof, said upper and said lower part having complementary faces passing through a chamber above said equalizing discharge piston; and a unitary structure consisting of an insert having like complementary faces and having integral therewith valve mechanism for simultaneously separating said chamber by a partition, venting fluid pressure from the top of said equalizing discharge piston, cutting feed valve pressure off of said rotary valve and restricting the flow of main reservoir pressure to the top of said rotary valve.

In testimony whereof I affix my signature.

CHARLES S. BUSHNELL.